(12) United States Patent
Nakagawa

(10) Patent No.: US 11,949,838 B2
(45) Date of Patent: Apr. 2, 2024

(54) PROCESSING DEVICE CAPABLE OF USER AUTHENTICATION AND USER AUTHENTICATION RECEPTION METHOD

(71) Applicant: SHARP KABUSHIKI KAISHA, Sakai (JP)

(72) Inventor: Kanji Nakagawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/091,169

(22) Filed: Dec. 29, 2022

(65) Prior Publication Data
US 2023/0216977 A1 Jul. 6, 2023

(30) Foreign Application Priority Data

Jan. 5, 2022 (JP) .................................. 2022-000625

(51) Int. Cl.
*H04N 1/44* (2006.01)
*H04N 1/00* (2006.01)

(52) U.S. Cl.
CPC ....... *H04N 1/4426* (2013.01); *H04N 1/00204* (2013.01); *H04N 1/00437* (2013.01);
(Continued)

(58) Field of Classification Search
None
See application file for complete search history.

(56) References Cited

U.S. PATENT DOCUMENTS 5,544,321 A * 8/1996 Theimer ................. H04L 67/62
380/258
2005/0270567 A1* 12/2005 Du ..................... H04N 1/32502
358/1.15
(Continued)

FOREIGN PATENT DOCUMENTS

JP        2017-019197 A       1/2017

*Primary Examiner* — Miya J Cato
*Assistant Examiner* — Pawan Dhingra
(74) *Attorney, Agent, or Firm* — ScienBiziP, P.C.

(57) ABSTRACT

The number of operational errors where a user unintentionally logs in as another user in quick login is reduced.
A processing device capable of user authentication includes a user registrator that receives registration of terminal identification information of a portable communication terminal as one piece of personal information associated with a user, a storage device that stores the personal information for each user, a user authenticator that displays a selection item related to a registered user on a user authentication screen, and performs authentication of the user in response to a selection, a terminal information acquirer that performs wireless communication with the portable communication terminal carried by a nearby user to acquire the terminal identification information of the portable communication terminal, and a nearby terminal determiner that determines whether the terminal identification information acquired matches the terminal identification information included in the personal information of the nearby user. In a case where the terminal identification information acquired matches the terminal identification information of the nearby user, the user authenticator displays a user selection item of the nearby user on the user authentication screen, in a manner such that the user selection item of the nearby user has a priority higher than the user selection item of another user.

7 Claims, 16 Drawing Sheets

(52) U.S. Cl.
CPC ......... *H04N 1/00506* (2013.01); *H04N 1/444* (2013.01); *H04N 2201/0094* (2013.01)

(56) References Cited

U.S. PATENT DOCUMENTS

| | | | |
|---|---|---|---|
| 2015/0242602 A1* | 8/2015 | Skygebjerg | H04W 12/06 |
| | | | 726/7 |
| 2016/0246364 A1* | 8/2016 | Miller | G09G 5/003 |
| 2016/0253137 A1* | 9/2016 | Nakao | G06F 3/1259 |
| | | | 358/1.14 |
| 2017/0013152 A1* | 1/2017 | Morii | H04N 1/00509 |
| 2017/0160881 A1* | 6/2017 | Kanemoto | G06F 3/0482 |
| 2017/0223537 A1* | 8/2017 | Lee | H04L 63/0876 |
| 2018/0048630 A1* | 2/2018 | Griffin | H04L 63/105 |
| 2019/0078908 A1* | 3/2019 | Wang | G06Q 30/0261 |
| 2020/0236116 A1* | 7/2020 | Bower | G06K 19/0723 |
| 2020/0389442 A1* | 12/2020 | Hassan | H04L 63/083 |
| 2022/0164147 A1* | 5/2022 | Yoshida | G06F 21/35 |
| 2023/0298766 A1* | 9/2023 | Suzuki | G16H 50/80 |
| | | | 705/2 |

* cited by examiner

PROCESSING DEVICE CAPABLE OF USER AUTHENTICATION AND USER AUTHENTICATION RECEPTION METHOD

TECHNICAL FIELD

The disclosure relates to a processing device capable of user authentication and a user authentication reception method that allow a user authentication screen to display selection items related to registered users to receive a selection operation and perform authentication of a selected registered user.

BACKGROUND ART

Some image processing devices, such as Multifunction Peripherals (or also referred to as MFPs), that are operated by a user have, for each user who has been registered (also referred to as a registered user or a registration user), a user authentication function to configure functions to be enabled and preferred adjustments and manage a usage history and accounting. This applies not only to processing devices of which a processing target is an image but also processing devices that process information, money, and the like. In a case of using a processing device in which user authentication is configured by an administrator, a user needs to perform a login operation to use the device so as to be authenticated. There are various user authentication methods.

Known methods include a method of inputting a user specific number given by an administrator, a method of using a login name and a password specific to a user, and a method of using an IC card. In recent years, there is also a biometric authentication method using a fingerprint, an iris, a face, or the like.

On the one hand, the image processing device may be installed in an environment in which entrance to a room or building of the installed device requires a strict security check to be performed. The image processing device may also be installed in a small office shared by only a limited number of members known to each other. The users of such image processing devices, in particular, tend to desire that the user authentication be as simple as possible. There has been a user demand that frequently used functions and preferred adjustments be switchable for each user and such switching be executable with a simple operation.

To meet such a user demand, there is a method in which users are authenticated by tapping on an icon configured for each user in advance. Such a method of performing user authentication through selection of an icon is referred to as quick login in the present specification. In order to perform user authentication using quick login, user information is associated and registered with the icon to be operated and displayed on a user authentication screen. A user who believes that just selecting an icon is not secure may choose to associate a password or the like with the user's icon and be prompted to input the password following the selection of the icon. In contrast, for a user who believes password input is not necessary, once the icon is selected, login is complete and the image processing device can be used.

Hold printing is widely known for the purpose of preventing information leakage resulting from printed materials being accidentally taken by another user or printed materials being left as they are. In hold printing, a user authentication screen for quick login is displayed on an operation inputter of the image processing device in a case where a print start operation is performed. This applies to copy jobs and scan jobs.

The following technique is known that relates to a simple user authentication method in which a list of pieces of registered user identification information is displayed on the user authentication screen and one of the pieces is selected for login. This relates to hold printing in which documents transmitted from an external device such as a PC are not immediately printed at the time point they are received but are held once in a hard disk inside the MFP, and login is performed via a touch panel of the MFP to perform a print start operation. The display, on the user authentication screen, of user identification information of a user is prioritized over other users, the user instructing the input of the documents by using the PC.

SUMMARY

Technical Problem

Quick login simplifies operations related to user authentication, but at the same time, may cause selection of another user by mistake in a case where input of a password is not required. For example, there may be a case where a user who has set up the MFP to perform color scanning logs in by accidentally selecting a user who has set up the MFP to perform monochrome scanning, causing monochrome scanning to be performed despite the intention to perform color scanning. In a case where, when transmitting an instruction to perform hold printing for document data from an external device such as a PC to an image processing device, user identification information is added and transmitted, and another user is accidentally selected during log into perform a print start operation in the image processing device, the user cannot find the document data that the user previously transmitted to the image processing device. As a result, it may be determined that the PC or the image processing device has lost the data, which may lead to a complaint.

The disclosure is made in consideration of the circumstances described above, and provides a technique that enables reduction of the number of operational errors where a user unintentionally logs in as another user in the quick login.

Solution to Problem

The disclosure provides a processing device capable of user authentication, the processing device including: a user registrator that receives registration of a user and terminal identification information of a portable communication terminal as one piece of personal information associated with the user; a storage device that stores the personal information for each user; a user authenticator that displays a selection item related to a registered user on a user authentication screen and performs authentication of the registered user in response to a selection operation; a terminal information acquirer that performs wireless communication with the portable communication terminal carried by a nearby user to acquire the terminal identification information of the portable communication terminal; and a nearby terminal determiner that determines whether the terminal identification information acquired by the terminal information acquirer matches the terminal identification information included in the personal information of the nearby user, wherein in a case where the terminal identification information acquired by the terminal information acquirer matches the terminal identification information included in the personal information of the nearby user, the user authenticator displays a user selection item of the nearby user on the user authentication screen, in a manner such that the user selection item of the nearby user has a priority higher than user selection item of another user.

From a different perspective, the disclosure provides a user authentication reception method including: by a processor, receiving registration of a user and terminal identification information of a portable communication terminal as one piece of personal information associated with the user, and storing the user and the terminal identification information in a storage device; displaying a selection item related to a registered user on a user authentication screen and performing authentication of the registered user in response to a selection operation; performing wireless communication with the portable communication terminal carried by a nearby user to acquire the terminal identification information of the portable communication terminal; determining whether the terminal identification information acquired by the terminal information acquirer matches the terminal identification information included in the personal information of the nearby user; and in a case where the terminal identification information acquired by the terminal information acquirer matches the terminal identification information included in the personal information of the nearby user, displaying a user selection item of the nearby user, in a manner such that the user selection item of the nearby user has a priority higher than user selection item of another user.

Advantage Effects of Disclosure

In the processing device according to the disclosure, in a case where the terminal identification information acquired by the terminal information acquirer matches the terminal identification information included in the personal information of the nearby user, the user authenticator displays the user selection item of the nearby user on the user authentication screen, in a manner such that the user selection item of the nearby user has a priority higher than the user selection item of another user. This reduces the number of operational errors where a user unintentionally logs in as another user.

The user authentication reception method according to the disclosure also has the same effects.

DESCRIPTION OF EMBODIMENTS

The disclosure will be described below in further detail with reference to the drawings. Note that the following description is in all aspects illustrative, and it should not be understood that the description restricts the disclosure.

First Embodiment

Configuration Example of Multifunction Peripheral

Figure 1:
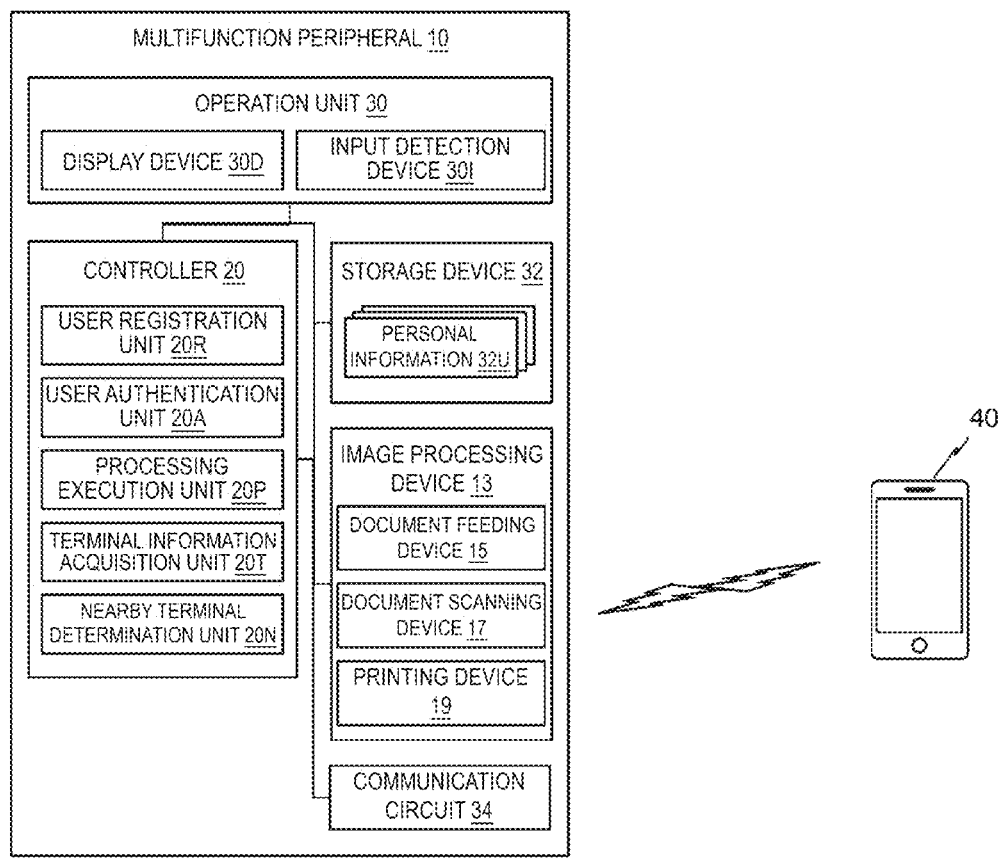
FIG. 1 is an explanatory diagram illustrating a configuration example of a multifunction peripheral according to an aspect of a processing device in a first embodiment.
Figure 2:
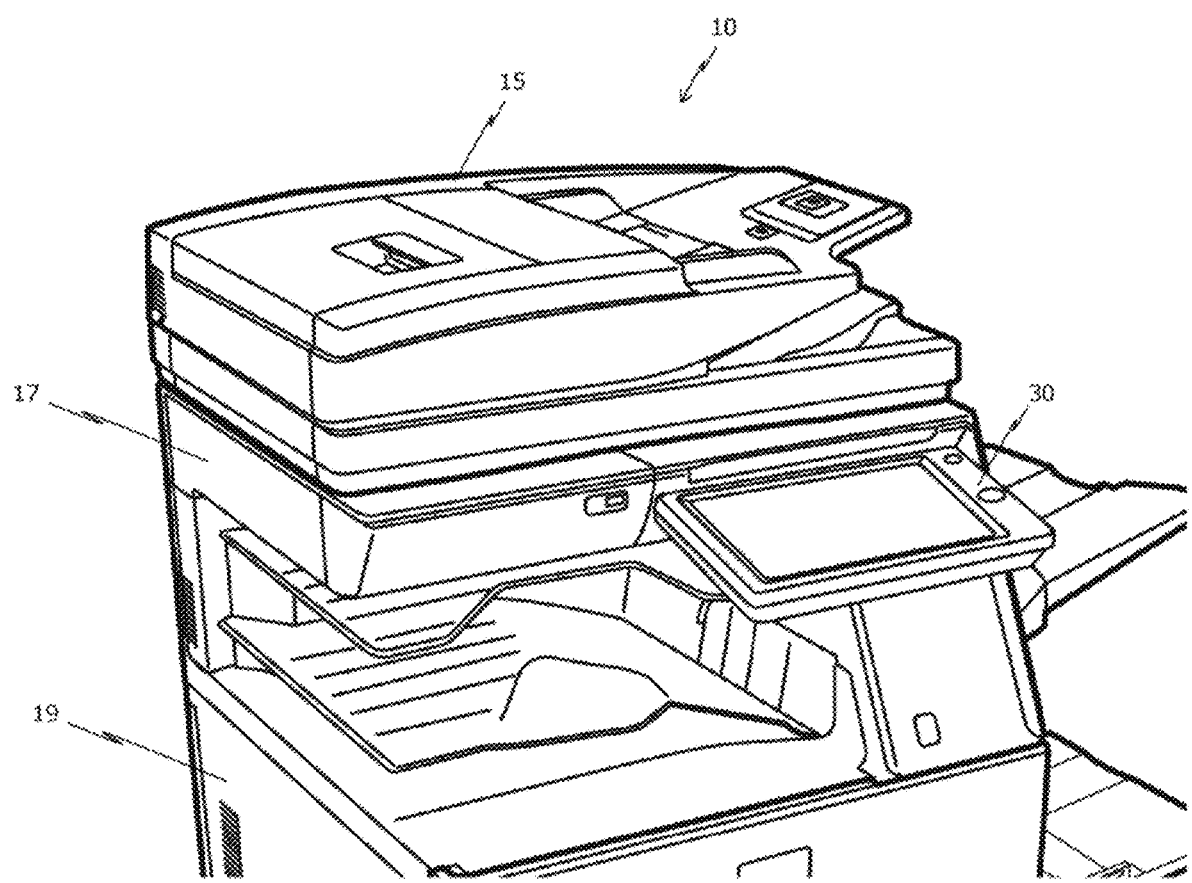
FIG. 2 is an external perspective view illustrating a part related to operation of user authentication of the multifunction peripheral illustrated in FIG. 1.

FIG. 1 is an explanatory diagram, in the present embodiment, illustrating a configuration example of a multifunction peripheral according to an aspect of a processing device of the disclosure. As illustrated in FIG. 1, a multifunction peripheral 10 according to the present embodiment includes an image processing device 13, a document feeding device 15 that feeds a document, a document scanning device 17 that reads the document, and a printing device 19. The multifunction peripheral 10 further includes a storage device 32 and a communication circuit 34.

The image processing device 13 includes a display device 30D such as a liquid crystal display device and an Organic Light Emitting Display (OLED), and an input detection device 30I such as a touch panel. The display device 30D presents a user who uses the multifunction peripheral 10 with pieces of information related to a state of the multifunction peripheral 10 and processing to be performed. A user authentication screen for quick login to be described below is one of the presented pieces of information as well. The input detection device 30I receives an operation of the user.

The document feeding device 15 feeds a document to the document scanning device 17. The document scanning device 17 reads the document and generates image data thereof. The printing device 19 performs printing based on the image data. In FIG. 1, the document feeding device 15, the document scanning device 17, and the printing device 19 belong to the image processing device 13. This is because each of the above devices relates to processing of an image.

A controller 20 primarily includes a processor and a memory as hardware resources. The processor performs a processing program stored in the memory, and the controller 20 thereby controls the above-described elements constituting the multifunction peripheral 10. The controller 20 includes a user registrator 20R, a user authenticator 20A, a processing executor 20P, a terminal information acquirer 20T, and a nearby terminal determiner 20N.

The user registrator 20R performs processing of receiving and managing registration of a user authorized to use the multifunction peripheral 10.

The user authenticator 20A performs processing of user authentication in a case where the multifunction peripheral 10 is used. In the present embodiment, user authentication using a quick login method will be described.

The processing executor 20P controls the image processing device 13, the storage device 32, and the communication circuit 34 to thereby perform processing related to the operation of the user received via the input detection device 30I of the operation inputter 30. Then, the processing executor 20P performs processing related to an image, such as a scanner job for scanning a document and outputting image data thereof, a printer job for printing, or a copy job.

The terminal information acquirer 20T performs communication with a portable communication terminal (hereinafter also simply referred to as a portable terminal) present at a position near the multifunction peripheral 10 to acquire terminal identification information specific to the portable terminal. As a method of communicating with such a nearby portable terminal, in the present embodiment, Bluetooth (trade name) is used to perform communication with the portable terminal.

The nearby terminal determiner 20N determines whether the terminal identification information acquired from the nearby portable terminal through communication using Bluetooth matches terminal identification information stored in the storage device 32 described below as personal information of a registered user.

The storage device 32 stores image data of a read document, data (personal information 32U) related to the user registered by the user registrator 20R, and data related to processing of the controller 20.

The communication circuit 34 is a circuit that performs communication with an external device, such as a Personal Computer (PC), that provides print data related to the print job. The communication circuit 34 in the present embodiment includes the communication using Bluetooth for communicating with the portable terminal present at a nearby position.

Quick Login and Pre-User Registration

First of all, registered users will be described, which constitute the basics and the premise of user authentication according to the present embodiment.

In the present embodiment, the multifunction peripheral 10 is used by registered users. In order to determine whether a user is allowed to use the multifunction peripheral 10, the user authenticator 20A performs user authentication using a quick login method.

The premise is that users need to register themselves with the multifunction peripheral 10 to use the multifunction peripheral 10 that performs user authentication using quick login. The registration is performed so that the users are displayed as selection items on a screen (user authentication screen) through which the quick login operation is performed.

Figure 3:
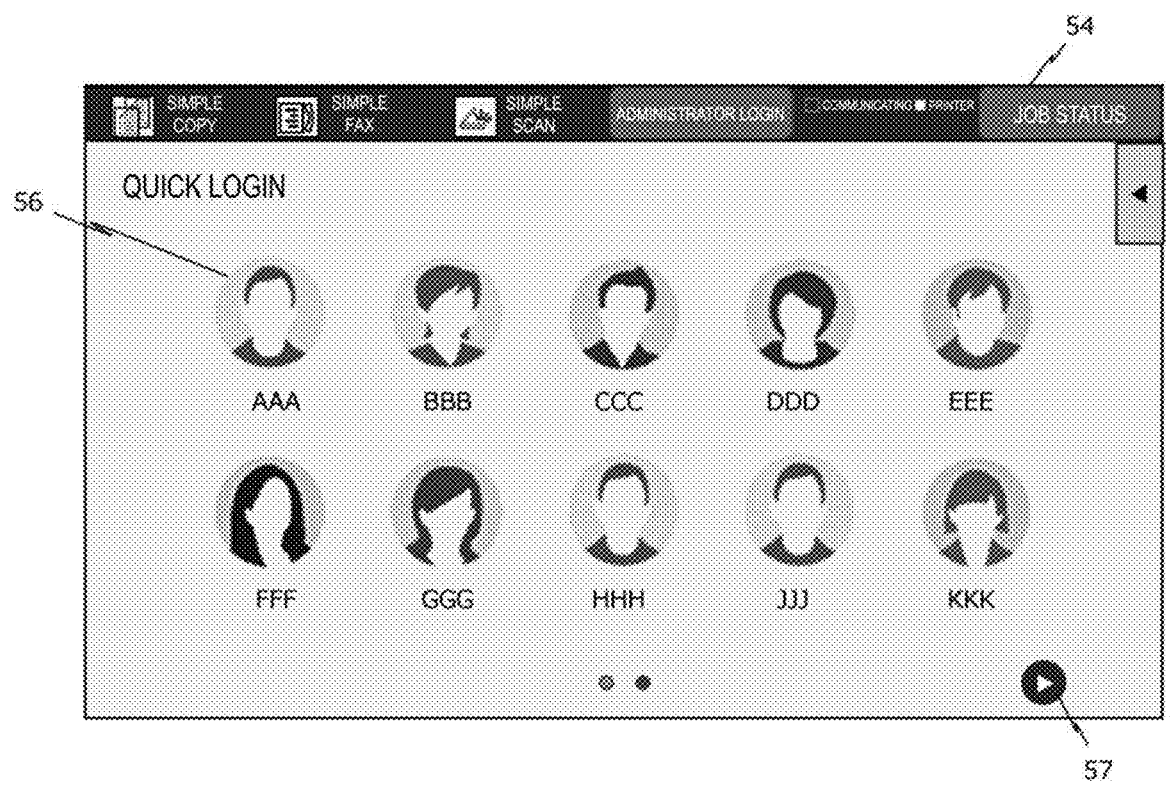
FIG. 3 is an explanatory diagram illustrating an example of a user authentication screen that a controller displays on a display device in a case where a nearby portable terminal is not detected in the present embodiment.

FIG. 3 is an explanatory diagram illustrating an example of the user authentication screen that the user authenticator 20A displays on the display device 30D. The example of FIG. 3 is an example in which the user authenticator 20A displays, in a matrix, user icons corresponding to the respective registered users on a user authentication screen 54 as selection items of the registered users. For example, in a case where a user icon 56 corresponding to a registered user AAA is touched, in response to the operation, the user authenticator 20A performs processing of authenticating the registered user AAA. Note that, in a case where there are many registered users and their user icons cannot be displayed in a single screen, as illustrated in FIG. 3, the user authenticator 20A displays an arrow key 57. In a case where the arrow key 57 is touched, in response to the touch, the user authenticator 20A switches the user icons displayed on the user authentication screen 54 to other user icons that cannot be displayed in the single screen.

From this time on and until a logout operation is performed, the controller 20 displays a screen on the display device 30D, based on the personal information 32U associated with the registered user AAA. The controller 20 receives an operation received by the operation inputter 30 as an operation performed by the registered user AAA, and performs processing.

Figure 4:
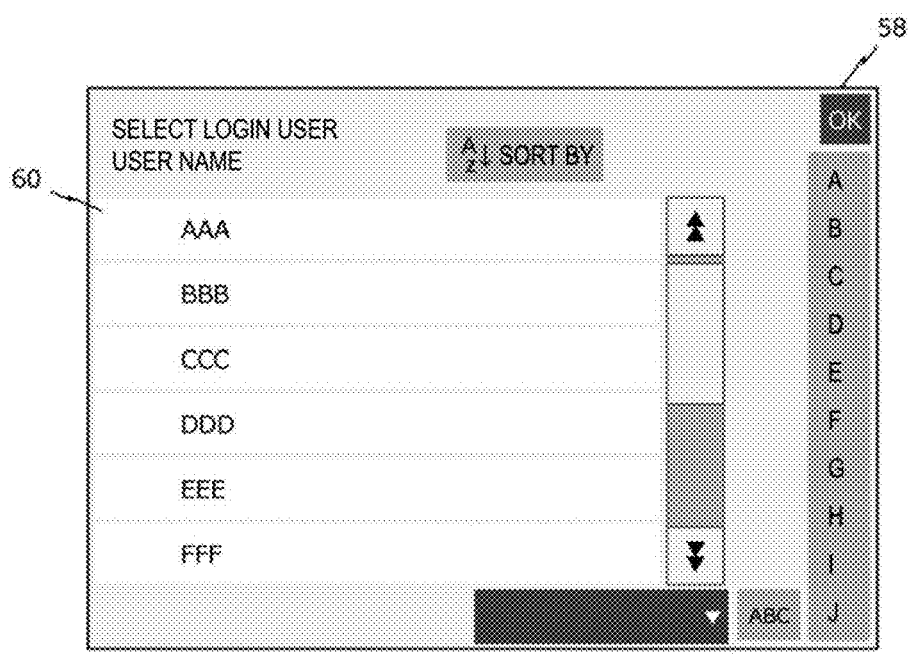
FIG. 4 is an explanatory diagram illustrating a different example of a user authentication screen that the controller displays on the display device in a case where a nearby portable terminal is not detected in the present embodiment.

FIG. 4 illustrates an example of a user authentication screen of a type different from that of FIG. 3. FIG. 3 illustrates a manner in which the array of user icons serves as an array of selection items for receiving a selection related to a registered user. In contrast, a user authentication screen 58 illustrated in FIG. 4 illustrates a manner in which a list of registered user names, in place of the user icons, serves as a list of selection items for receiving a selection related to a registered user. The user names (AAA, BBB, CCC, . . . ) displayed in a user list 60 illustrated in FIG. 4 correspond to the user names displayed below the user icons illustrated in FIG. 3.

Although the following is illustrative of the manner in which the user icons serve as selection items, the description applies to other manners in which the user icons serve as selection items as well.

Figure 5:
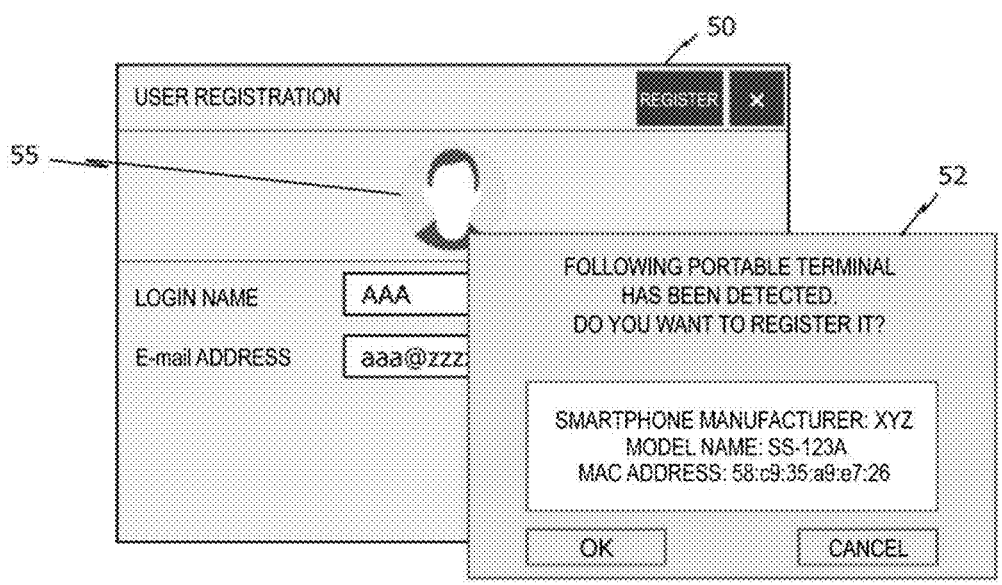
FIG. 5 is an explanatory diagram illustrating an example of a dialog that the controller displays on the display device in a case of user registration in the present embodiment.

The user registrator 20R receives an operation related to registration of a user and performs processing of registration. The user to perform registration, who carries their own portable terminal 40, performs a prescribed operation on the operation inputter 30 of the multifunction peripheral 10, and displays the user registration screen (not illustrated) on the display device 30D. Information necessary for registration is input as personal information via the user registration screen. Furthermore, processing of pairing related to Bluetooth communication is performed. FIG. 5 is an example of a dialog that the user registrator 20R displays on the display device 30D in a case where pairing is performed.

As illustrated in FIG. 5, the user registrator 20R displays a user registration dialog 50 that illustrates the personal information (in the example illustrated in FIG. 5, a user icon 55, a login name, and an E-mail address) of the user input via the user registration screen. Furthermore, the user registrator 20R displays, in a user registration dialog 52, contents of terminal identification information related to the portable terminal 40 to be registered as the personal information to thereby request confirmation. In the example illustrated in FIG. 5, a manufacturer name, a model name, and a MAC address of the portable terminal 40 are used as the terminal identification information. Those pieces of information are acquired from the portable terminal 40 through Bluetooth communication.

After the user registrator 20R recognizes that an [OK] key of the user registration dialog 52 is touched, the user registrator 20R stores, in the storage device 32, the terminal identification information as the personal information 32U related to the registered user together with other pieces of information input via the user registration screen.

After completion of the user registration as described above, in a case where the portable terminal 40 of the registered user approaches the multifunction peripheral 10, the terminal information acquirer 20T recognizes the approach of the portable terminal 40 and acquires the terminal identification information. The nearby terminal determiner 20N determines that the terminal identification information acquired from the portable terminal 40 is related to the registered user. Based on the determination, the user authenticator 20A prioritizes the display of the selection item related to the registered user on the user authentication screen.

User Authentication Using Quick Login

With reference to flowcharts, the following will describe processing of user authentication using quick login performed by the controller 20 in the present embodiment with the assumption that the user is registered as described above.

Figure 6:
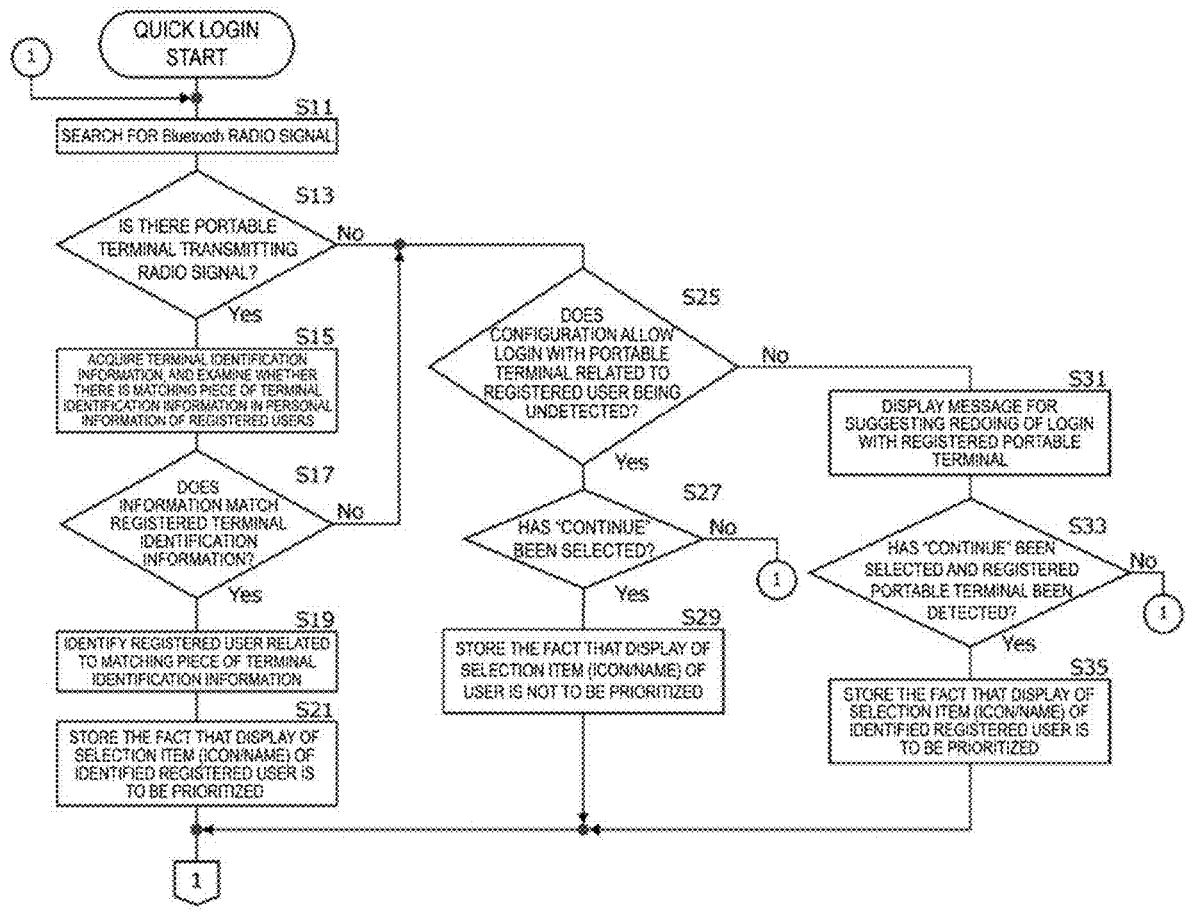
FIG. 6 is a first flowchart illustrating a procedure of processing related to user authentication performed by the controller in the present embodiment.
Figure 7:
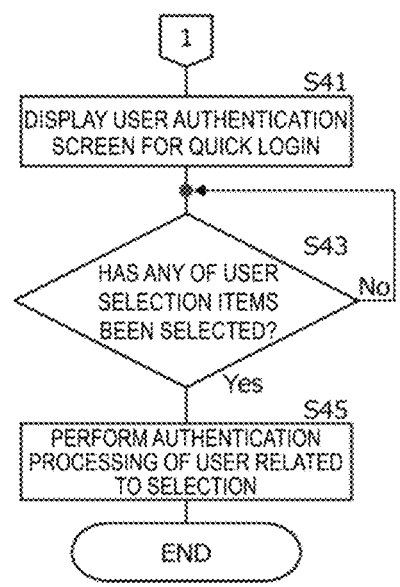
FIG. 7 is a second flowchart illustrating a procedure of processing related to user authentication performed by the controller in the present embodiment.

FIG. 6 and FIG. 7 are each a flowchart illustrating a procedure of processing related to user authentication performed by the controller 20 in the present embodiment.

As illustrated in FIG. 6, the controller 20 as the terminal information acquirer 20T searches whether there is a portable terminal transmitting a radio signal nearby through Bluetooth communication (Step S11). In a case where there is a portable terminal transmitting a radio signal nearby (Yes in Step S13), the controller 20 performs Bluetooth communication with the portable terminal to acquire its terminal identification information. Then, the controller 20 as the nearby terminal determiner 20N examines whether a matching piece of terminal identification information is registered in the personal information 32U of the registered user stored in the storage device 32 (Step S15).

In a case where the terminal identification information acquired through Bluetooth communication matches one of the pieces of terminal identification information stored as the personal information 32U (Yes in Step S17), the controller 20 as the nearby terminal determiner 20N identifies the registered user related to the matching piece of terminal identification information (Step S19). Then, the controller 20 stores the fact that the display of the identified registered user is to be prioritized, the display being on the user authentication screen to be displayed in Step S41 of FIG. 7 to be described below (Step S21).

As a result of the determination of Step S13, in a case where there is no portable terminal transmitting a radio signal (No in Step S13), the controller 20 as the user authenticator 20A determines whether the configuration allows quick login in a state in which the portable terminal related to the registered user is undetected (Step S25).

As a result of the determination of Step S17, similarly, also in a case where the terminal identification information acquired through Bluetooth communication does not match any of the pieces of terminal identification information related to the registered users (No in Step S17), the controller 20 determines whether the configuration allows quick login in a state in which the portable terminal related to the registered user is undetected (Step S25). The configuration is performed by an administrator of the multifunction peripheral 10 in advance.

In a case where the configuration allows quick login in a state in which the portable terminal related to the registered user is undetected (Yes in Step S25), the controller 20 as the user authenticator 20A proceeds with the processing in Step S27. In Step S27, the controller 20 inquires of the user whether to allow quick login in a state in which the portable terminal related to the registered user is undetected.

Figure 8:
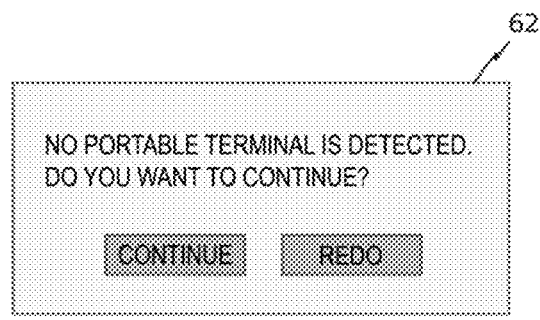
FIG. 8 is an explanatory diagram illustrating an example of a message dialog that the controller displays on the display device in a case where a nearby portable terminal is not detected in the present embodiment.

FIG. 8 illustrates an example of a message dialog 62 for inquiring of the user whether to allow quick login in a state in which the portable terminal related to the registered user is undetected. In a case where a [Continue] key is operated in the message dialog 62, the controller 20 as the user authenticator 20A continues user authentication. Then, the controller 20 stores the fact that there is no registered user whose display is to be prioritized in a case where the user authentication screen is displayed in Step S41 of FIG. 7 to be described below (Step S29). Subsequently, the controller 20 proceeds with the processing of Step S41 in FIG. 7, and displays the user authentication screen on the display device 30D.

In a case where a [Redo] key is operated in the message dialog 62 of FIG. 8, the controller 20 as the user authenticator 20A returns the processing to Step S11, and redoes the procedure for user authentication from the beginning.

Figure 9:
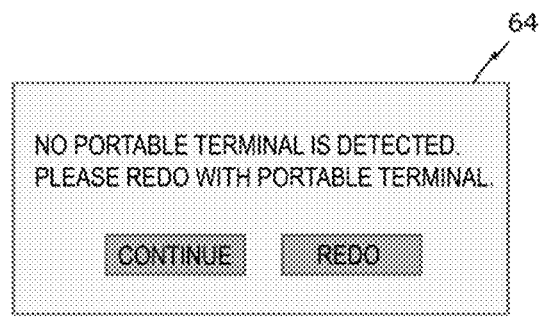
FIG. 9 is an explanatory diagram illustrating a different example of a message dialog that the controller displays on the display device in a case where a nearby portable terminal is not detected in the present embodiment.

As a result of the above-described determination of Step S25, in a case where the configuration does not allow quick login in a state in which the portable terminal related to the registered user is undetected (No in Step S25), the controller 20 as the user authenticator 20A proceeds with the processing of Step S31. In Step S31, the controller 20 displays, on the display device 30D, a message for suggesting redoing of the quick login operation with a registered portable terminal to prompt a confirmation by the user. FIG. 9 is an example of a message dialog that the controller as the user authenticator 20A displays in Step S31.

Suppose that the user brings the portable terminal near the multifunction peripheral 10, so that the portable terminal is detected through Bluetooth communication, and a [Continue] key is operated in a message dialog 64 illustrated in FIG. 9. In this case, the controller 20 as the user authenticator 20A proceeds with the processing of Step S41 in FIG. 7, and displays the user authentication screen on the display device 30D.

In a case where an operation is performed on a [Redo] key in the message dialog 64 of FIG. 9, the controller 20 as the user authenticator 20A returns the processing to Step S11, and redoes the procedure of user authentication from the beginning.

In Step S41 illustrated in FIG. 7, the controller as the user authenticator 20A displays a user authentication screen for quick login on the display device 30D.

Figure 10:
FIG. 10 is an explanatory diagram illustrating an example of a user authentication screen that the controller displays on the display device in a case where a nearby portable terminal is detected in the present embodiment.

FIG. 10 illustrates an example of a user authentication screen in a case where the portable terminal 40 related to the registered user is detected at a position near the multifunction peripheral 10. On a user authentication screen 66 illustrated in FIG. 10, user icons are displayed in two rows of an upper row and a lower row. This illustrates a state in which two user icons 68 in the upper row are related to registered users GGG and AAA, and the portable terminals matching the pieces of terminal identification information registered as pieces of the personal information of those users are located at positions near the multifunction peripheral 10.

In contrast, five user icons 70 in the lower row are related to the registered users, but the portable terminals matching the pieces of terminal identification information associated with those users are not detected. In other words, the controller 20 as the user authenticator 20A displays, in the upper row, the user icons related to the registered users whose nearby portable terminals are detected, and displays, in the lower row, the user icons related to the registered users whose portable terminals are not detected. The user icons displayed in the upper row are user icons for prioritized display.

In a case where no portable terminal related to the registered user is detected at all, instead of the user authentication screen 66 of FIG. 10, as in the user authentication screen 54 illustrated in FIG. 3, the user icons of the registered users are displayed not in an upper row and/or a lower row but in a matrix. In other words, the user icons are displayed in a manner in which no prioritized display is performed. In the lower row in FIG. 10, the user icons are displayed not in a matrix but in a single row. However, similarly to FIG. 3, the user icons may be displayed in a matrix.

In addition, the display of the user icons in the upper row may be different, in terms of size, intensity, color, or the like, from the display of the user icons in the lower row, and the size, intensity, color, or the like may be changed over time.

In the example illustrated in FIG. 10, the icons related to the registered users GGG and AAA whose portable terminals corresponding to the pieces of registered terminal identification information are located at nearby positions are displayed in the upper row in the same size. According to a manner in which icons are displayed different from the above, the icons of the registered users whose portable terminals are located at further nearby positions, among the icons arranged in the upper row, may be displayed in a larger size.

After displaying the user authentication screen, the user authenticator 20A waits for any one of the user icons to be selected (Step S43).

In a case where a user icon is selected, the user authenticator 20A performs processing of authenticating the selected registered user (Step S45), and terminates the processing related to user authentication.

Figure 11:
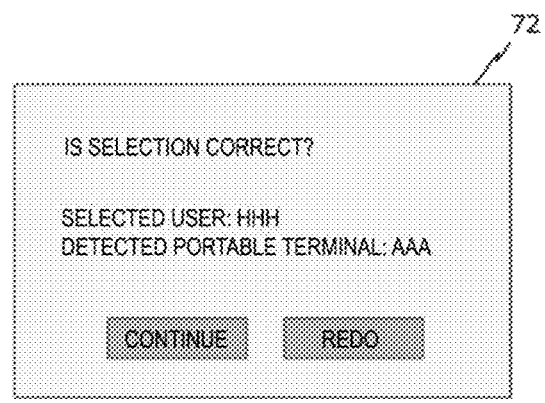
FIG. 11 is an explanatory diagram illustrating an example of a message dialog that the controller displays in a case where an icon of non-prioritized display is selected on the user authentication screen of FIG. 10.

Note that, even in a case where there are user icons 68 for prioritized display as in the user authentication screen 66 illustrated in FIG. 10, one of user icons 70 for non-prioritized display may be selected. In this case, the controller 20 as the user authenticator 20A may request a confirmation by the user as to whether the selection is correct. FIG. 11 illustrates an example of a dialog message for requesting a confirmation by the user in a case where a user icon for non-prioritized display is selected.

A message dialog 72 illustrated in FIG. 11 appears in a case where, despite the prioritized display of the user icon of the registered user AAA related to a nearby portable terminal, a user icon of a registered user HHH for non-prioritized display is selected. In a case where a [Continue] key is operated in the message dialog 72, the controller 20 as the user authenticator 20A determines that the selected registered user HHH is based on the user's intention and authenticates the selected user HHH.

In contrast, in a case where a [Redo] key is operated in the message dialog 72, the controller 20 as the user authenticator 20A determines that the user HHH is not selected and changes the display back to the initial user authentication screen to receive a new selection.

Second Embodiment

The user authentication screen 66 illustrated in FIG. 10 is a manner in which prioritized user icons are displayed in the upper row and non-prioritized user icons in the lower row. It can also be said that a difference in the priority is depicted according to the arrangement of user icons. The manner in which prioritized display is performed is not limited to the above manner.

Figure 12:
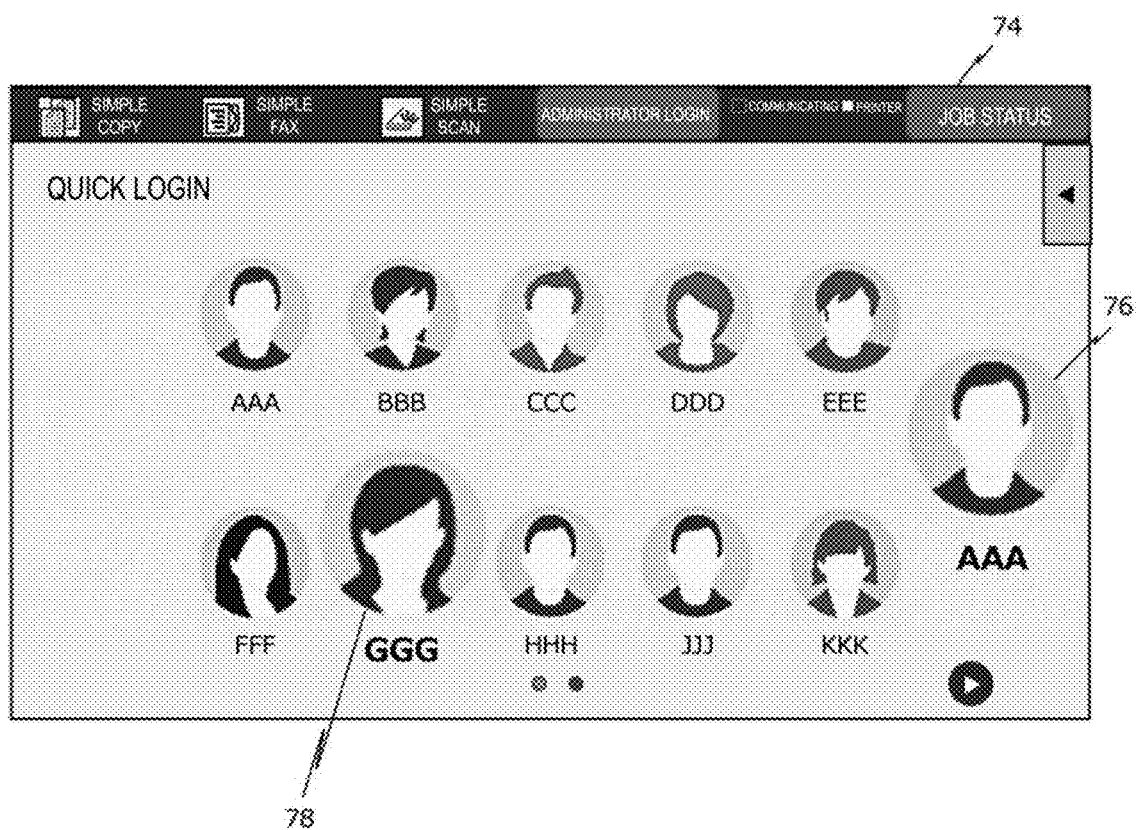
FIG. 12 is an explanatory diagram illustrating an example of a user authentication screen that the controller displays on the display device in a case where a nearby portable terminal is detected in a second embodiment.

FIG. 12 illustrates a different manner in which prioritized display of a user authentication screen is performed. In a user authentication screen 74 illustrated in FIG. 12, the user authenticator 20A arranges and displays user icons 76 related to registered users AAA to KKK in a matrix. At the same time, the user authenticator 20A displays the user icon 76 of the registered user AAA having the highest priority on the right side of the user icons arranged in a matrix.

The user icon related to the registered user AAA having the highest priority is displayed at a different position so as to overlap the user icons arranged in a matrix. Furthermore, the size of the user icon 76 having the highest priority is displayed larger than that of the user icons arranged in a matrix. Note that, among the user icons arranged in a matrix, there is a user icon displayed larger than other user icons. This is a user icon 78 related to the registered user GGG. The large user icon 78 denotes that the registered user GGG has the second highest priority, following the registered user AAA.

As in the user authentication screen 74, there may be a way of using a difference in sizes of the user icons to present prioritized display.

Note that the example illustrated in FIG. 12 corresponds to a state in which nearby portable terminals related to the registered users AAA and GGG are detected. This corresponds to a case where the nearby terminal determiner 20N determines that the strength of a received radio signal from the portable terminal related to the registered user AAA is higher than the strength of a received radio signal from the portable terminal related to the registered user GGG. The controller 20 as the user authenticator 20A determines that a portable terminal with a strong received radio signal is located at a closer position, and displays the user icon 76 related to the registered user AAA with the highest priority and displays the user icon 78 related to the registered user GGG with the second highest priority. As illustrated in FIG. 12, by displaying the user icon of prioritized display and the user icon of non-prioritized display in different sizes, the user icon of prioritized display is presented to the user in a more selectable manner.

Furthermore, there may be a way of differentiating the sizes of the user icons depending on the priority. For example, the controller 20 as the user authenticator 20A displays the user icon 76 related to the registered user AAA in a larger size than the user icon 78 related to the registered user GGG. Furthermore, the controller 20 displays the user icon 78 related to the registered user GGG in a larger size than the user icons displayed in a regular size. In other words, this is a way of displaying both of the user icons 76 and 78 related to the registered users AAA and GGG in a larger size than a regular size, and displaying the user icon 76 related to the registered user AAA larger than the user icon 78 related to the registered user GGG. In this manner, the user icons of prioritized display are presented to the user in a manner in which they are further selectable in order of priority.

Figure 13:
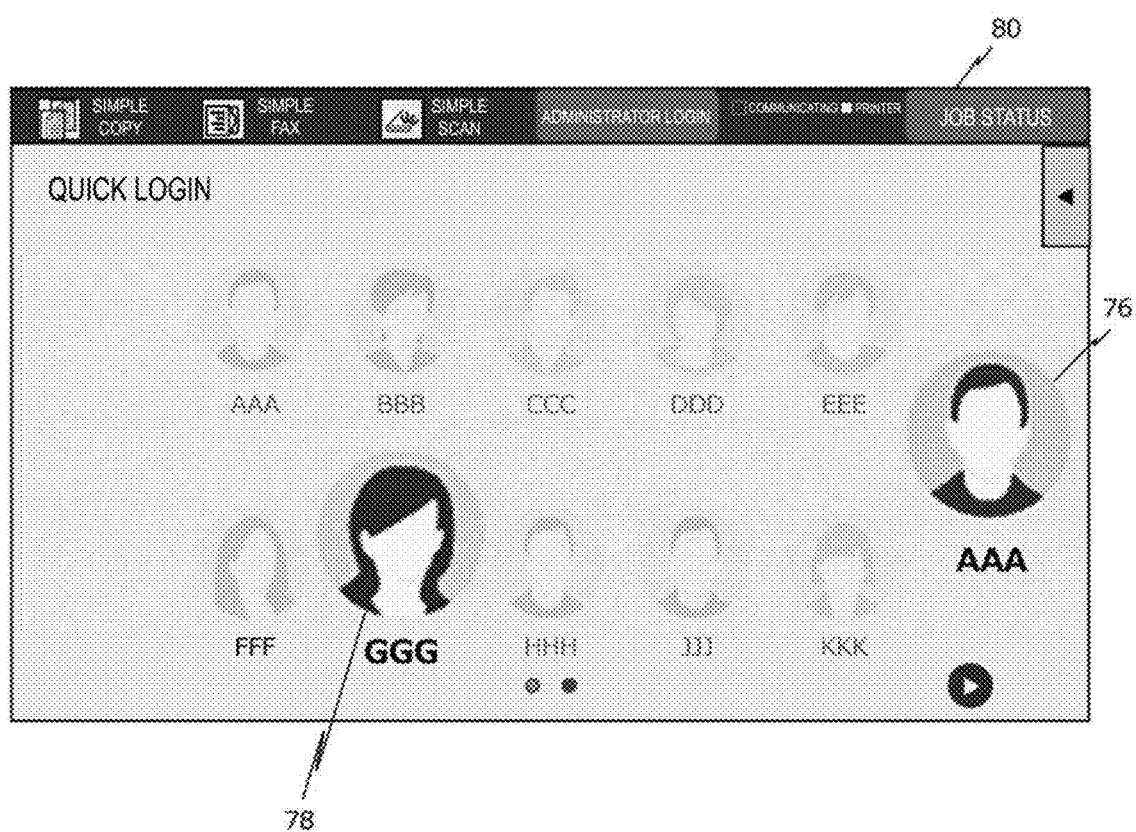
FIG. 13 is an explanatory diagram illustrating a different example of a user authentication screen that the controller displays on the display device in a case where a nearby portable terminal is detected in the second embodiment.

FIG. 13 illustrates a further different way of performing prioritized display of a user authentication screen. The arrangement of the user icons in a user authentication screen 80 illustrated in FIG. 13 is the same as that in FIG. 12. The difference from FIG. 12 lies in that the user icons of non-prioritized display are displayed in lower intensity than that of the user icons of prioritized display. As illustrated in FIG. 13, by displaying the user icon of prioritized display and the user icon of non-prioritized display in different intensities, the user icon of prioritized display is presented to the user in a further selectable manner.

Although FIG. 13 illustrates an example in which the user icon of prioritized display and the user icon of non-prioritized display are displayed in different intensities, there may be a way of displaying the user icon and the user icon of non-prioritized display in different colors instead of different intensities.

Furthermore, there may be a way of making prioritized display more easily noticeable by changing at least one of the position, the size, the intensity, and the color of the user icons over time, in addition to displaying the user icons with a fixed position, size, intensity, and color.

Third Embodiment

The present embodiment will describe a way of performing prioritized display in a user authentication screen with the assumption that Bluetooth communication with the portable terminal enables detection of not only a distance but also an approximate direction of the portable terminal.

Figure 14:
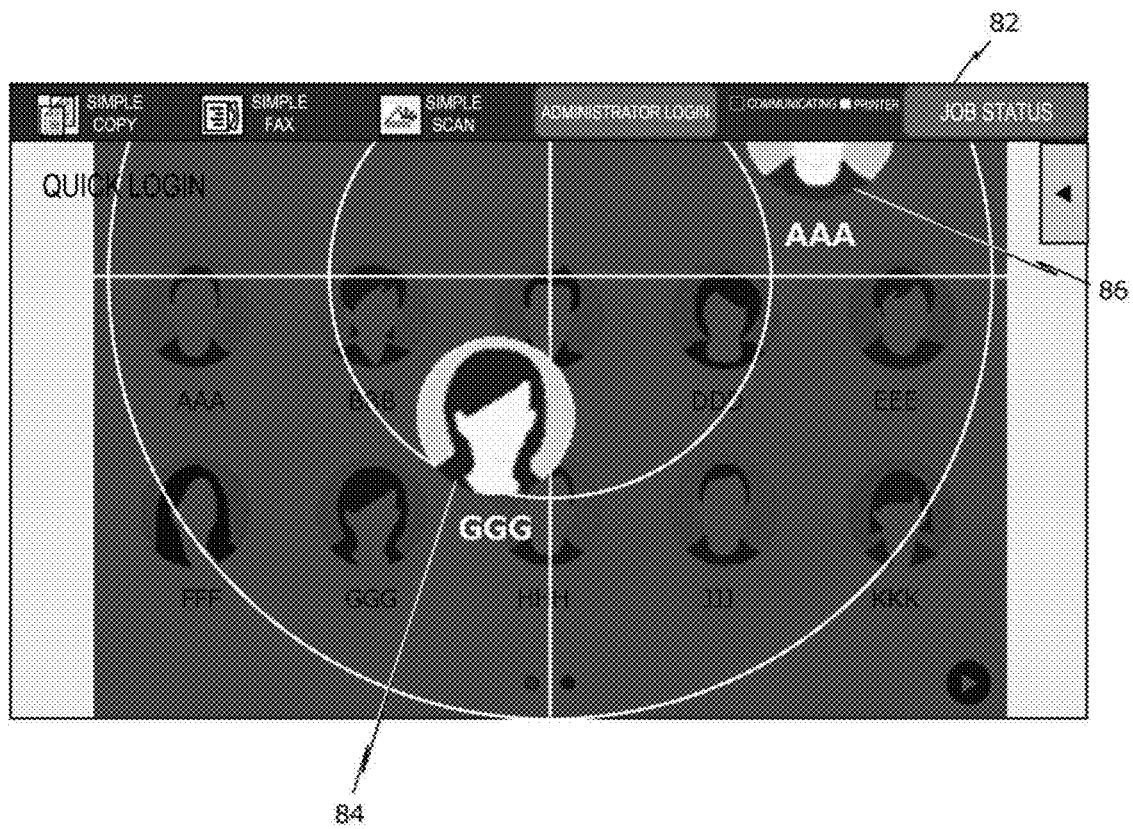
FIG. 14 is an explanatory diagram illustrating an example of a user authentication screen that the controller displays on the display device in a case where a nearby portable terminal is detected in a third embodiment.

FIG. 14 illustrates a different way of performing prioritized display of a user authentication screen. In a user authentication screen 82 illustrated in FIG. 14, the controller 20 as the user authenticator 20A arranges and displays the user icons 76 related to the registered users AAA to KKK in a matrix. At the same time, the displays of a user icon 84 of the registered user GGG and a user icon 86 of AAA whose portable terminals are detected are prioritized so as to overlap the user icons arranged in a matrix. The user icons 84 and 86 of prioritized display are arranged and displayed in accordance with approximate directions and distances of their respective portable terminals.

For example, Bluetooth 5.1 provides a direction detection function, and enables detection of a direction of a destination communication device. Application of the direction detection function enables implementation of the user authentication screen 82 illustrated in FIG. 14.

With this configuration, in a case where multiple nearby portable communication terminals are detected, the user icons are arranged in accordance with their respective distances and directions, thus reducing the number of operational errors where another user icon of prioritized display is selected by mistake.

Fourth Embodiment

In the present embodiment, in a case where a portable terminal which is not related to any one of the registered users is detected while the user authentication screen is displayed and a selection has yet to be made, the user is provided with a selection item for inquiring whether to update the terminal identification information related to one of the registered users by using the terminal identification information of the detected portable terminal.

Figure 15:
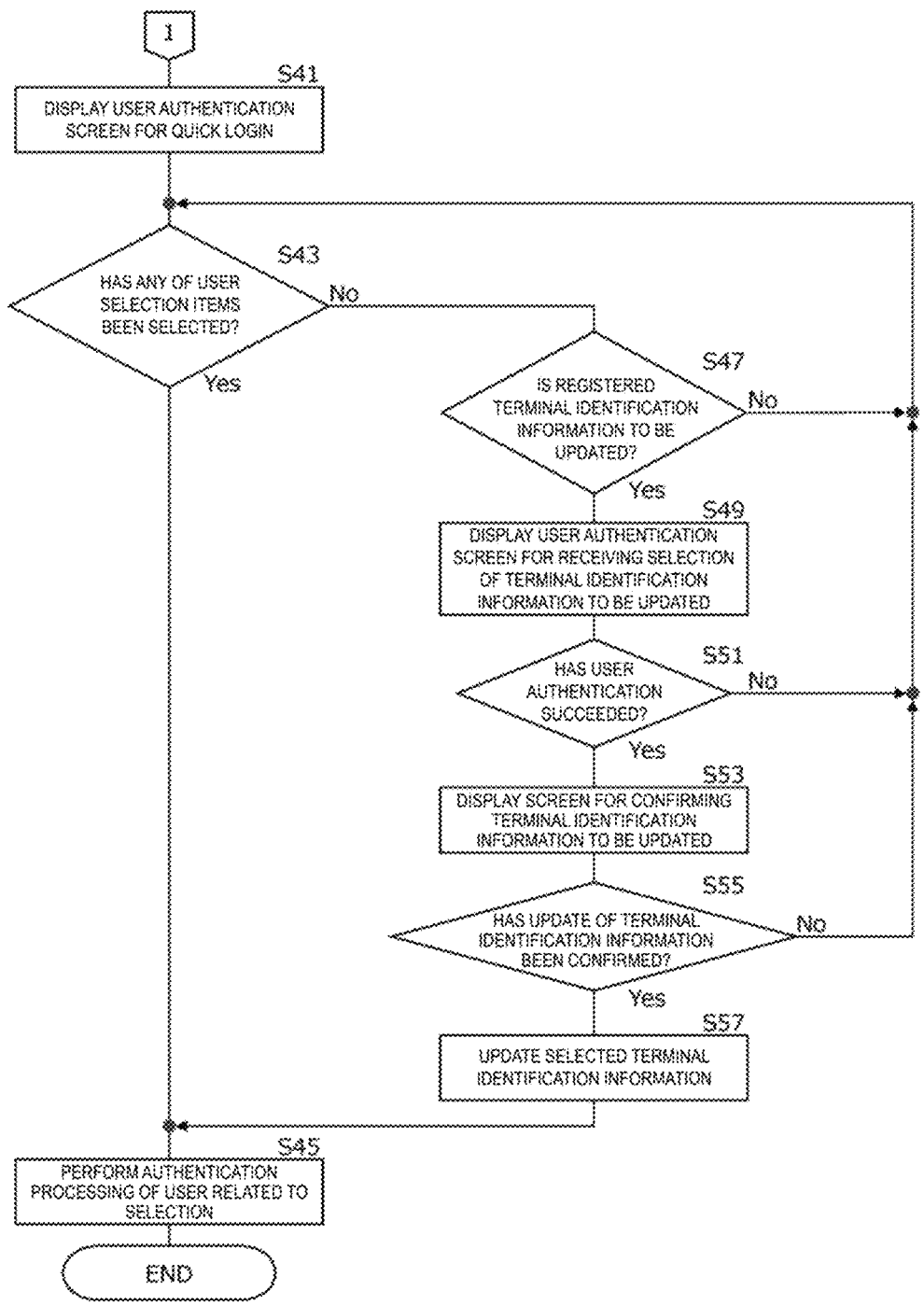
FIG. 15 is a flowchart illustrating a procedure of processing related to user authentication performed by the controller in a fourth embodiment, which corresponds to FIG. 6.

FIG. 15 is a flowchart illustrating a flow of processing in the present embodiment, in place of FIG. 7. The same processing as that of FIG. 7 is denoted by the same reference sign.

The controller 20 as the user authenticator 20A displays the user authentication screen illustrated in FIG. 10, for example, on the display device 30D (Step S41 illustrated in FIG. 15), and waits for a selection of any of the user icons (Step S43).

The processing in a case where any of user icons is selected (Yes in Step S43) is the same as that of FIG. 7, and the controller 20 authenticates the selected registered user (Step S45), and terminates the processing.

In contrast, in a case where, in a state in which a selection of a user icon is yet to be made in Step S43, the terminal information acquirer 20T detects a nearby portable terminal and the nearby terminal determiner 20N determines that the nearby portable terminal is a portable terminal related to the registered user, the controller 20 performs the following processing.

Figure 16:
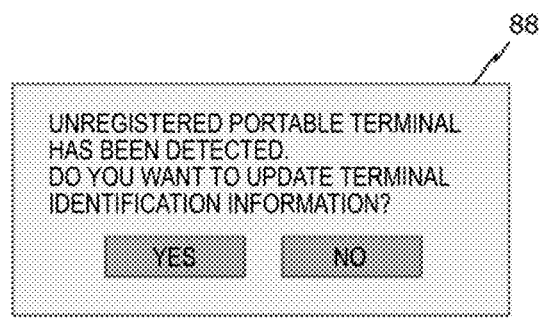
FIG. 16 is an explanatory diagram illustrating an example of a message dialog that the controller displays in a case where an unregistered portable terminal is detected in a fourth embodiment.

The controller 20 as the user authenticator 20A displays a message dialog 88 illustrated in FIG. 16 on the display device 30D, and inquires whether to update the terminal identification information related to one of the registered users (Step S47, after No in Step S43).

In a case where a [No] key is operated in response to the inquiry "Unregistered portable terminal has been detected. Do you want to update terminal identification information?" in the message dialog 88 (No in Step S47), the controller 20 returns the processing to Step S43 and waits for a selection of a user icon.

In contrast, in a case where a [Yes] key is operated in response to the inquiry in the message dialog 88 (Yes in Step S47), the controller 20 as the user authenticator 20A receives a selection of a registered user whose terminal identification information is to be updated. The registered user to be updated is selected through user authentication stricter than quick login (Step S49). One example is user authentication using the login name or the E-mail address illustrated in the user registration dialog 50 in FIG. 5 and a password (not illustrated) specific to the registered user.

In a case where the controller 20 as the user authenticator 20A succeeds in user authentication (Yes in Step S51), the controller 20 displays a screen for confirming contents of the terminal identification information to be updated and the terminal identification information after being updated on the display device 30D (Step S53). The contents are similar to those of the user registration dialog 52 illustrated in FIG. 5.

In a case where an [OK] key signifying continuation of the update processing is operated in the dialog (Yes in Step S55), the controller 20 as the user registrator 20R updates the terminal identification information of the registered user to be updated (Step S57). Then, the controller 20 authenticates the registered user to be updated (Step S45) and terminates the processing.

Note that, in a case where user authentication fails when updating the terminal identification information (No in Step S51) or in a case where a [Cancel] key is operated in the update confirmation dialog (No in Step S55), the controller 20 returns the processing to Step S43 and waits for a selection of a user icon.

As described above, (i) The processing device according to the disclosure includes a user registrator that receives registration of a user and terminal identification information of a portable communication terminal as one piece of personal information associated with the user; a storage device that stores the personal information for each user; a user authenticator that displays a selection item related to a registered user on a user authentication screen and performs authentication of the registered user in response to a selection operation; a terminal information acquirer that performs wireless communication with the portable communication terminal carried by a nearby user to acquire the terminal identification information of the portable communication terminal; and a nearby terminal determiner that determines whether the terminal identification information acquired by the terminal information acquirer matches the terminal identification information included in the personal information of the nearby user, wherein in a case where the terminal identification information acquired by the terminal information acquirer matches the terminal identification information included in the personal information of the nearby user, the user authenticator displays a user selection item of the nearby user on the user authentication screen, in a manner such that the user selection item of the nearby user has a priority higher than the user selection item of another user.

In the disclosure, the user registrator, the user authenticator, the terminal information acquirer, and the nearby terminal determiner perform processing related to their respective functions. Examples of specific configuration aspects thereof include a configuration aspect including a hardware circuit primarily provided with a processor and a memory and a processing program stored in the memory. In other words, it is a configuration aspect in which hardware resources including the processor and the memory and software of the processing program cooperate with each other to implement their respective functions.

The memory may or may not be common to the storage device described above. The storage device stores information such as attributes of a registered user and configurations associated with the user. Examples of specific aspects thereof include a Hard Disk Drive (HDD) and a Solid State Drive (SSD).

Furthermore, for example, the processing device includes the display device such as a liquid crystal display device, and the user authentication screen is one of the screens displayed on the display device. The user authentication screen is a screen displayed on the display device in a case where authentication of a user related to use of the processing device is performed.

The user authenticator displays a selection item related to the registered user on the user authentication screen. The selection item displayed on the user authentication screen is to be selected by the registered user to perform authentication. Specific aspects thereof include, for example, an icon displayed on a dot-matrix screen.

In a case where the user is authenticated by the user authenticator, the processing device applies the personal information associated with the user who has been authenticated (authenticated user), and performs processing in response to operations of the user. In other words, from a time when user authentication (login) is performed to logout, the processing device receives operations in a customized manner corresponding to the authenticated user, and performs processing. Contents of the personal information are different depending on processing performed by the processing device. Taking the multifunction peripheral as an example, functions available for the authenticated user may be configured by an administrator, and functions frequently used by the authenticated user and user-friendly configuration may be configured as an initial state. Furthermore, a usage history including accounting information may be recorded, and a power-save operation, accounting processing, and the like based on the record may be performed.

The portable communication terminal is a communication terminal carried by the user. Examples of specific aspects thereof include a mobile terminal such as a smartphone and a wearable terminal such as a smart watch and smart glasses.

Furthermore, a typical example of wireless communication performed with the nearby portable communication terminal is, for example, Bluetooth. The communication method is not limited to this. For example, wireless communication such as Near Field Communication (NFC) or Radio Frequency Identifier (RFID) is also considered to be applicable. However, in a case where communication coverage is excessively wide, communication is performed with even portable communication terminals that are not located at positions near the processing device, and thus it is preferable that the communication range be limited to approximately 10 meters or less. This is the communication coverage from the operation inputter through which the processing device receives operations of the user. In contrast, in a case where the communication range is excessively short, communication with the portable communication terminal carried by the user operating the processing device may fail. Thus, it is preferable that the communication range be at least 1 meter or more.

The terminal identification information is not particularly limited as long as the portable communication terminal can be identified. Examples of specific aspects thereof include a MAC address, a terminal identification number (IMEI), and the like of the portable communication terminal.

The processing device may be a processing device that performs processing based on operations of the user. Examples of specific aspects thereof include an image processing device such as a multifunction peripheral. The multifunction peripheral in the embodiments described above corresponds to the processing device of the disclosure.

Furthermore, preferred aspects of the disclosure will be described.

(ii) The user authenticator may present a difference in the priority, using at least one of an arrangement, a size, an intensity, or a color of the user selection item to be displayed on the user authentication screen, and a change of the arrangement, size, intensity, and color.

With this configuration, the user performing an operation on the user authentication screen can easily recognize the user selection item having a high priority and the user selection item having a low priority.

(iii) In a case where there are a plurality of nearby users, the terminal information acquirer may acquire the terminal identification information from the portable communication terminal carried by each of the plurality of nearby users, and the user authenticator may display, on the user authentication screen in a manner such that the user selection item has a higher priority, the user selection item of one of the plurality of nearby users carrying the portable communication terminal having a piece of the terminal identification information, among a plurality of pieces of the acquired terminal identification information, that matches one of a plurality of pieces of the terminal identification information registered by the user registrator.

With this configuration, in a case where the portable communication terminals related to multiple registered users are located near the processing device, the user selection item of the user located at a further nearby position can be displayed with a higher priority to be easily identified. The distance (interval) from the portable communication terminal may be, for example, determined based on the received signal strength of wireless communication with the portable communication terminal. It is assumed that the user operating the processing device is the user located at the nearest position, and thus even in a case where multiple portable communication terminals are located nearby, the number of operational errors where a user accidentally logs in as another user can be reduced.

(iv) The nearby terminal determiner may perform wireless communication with the portable communication terminal carried by the nearby user to detect a distance and a direction to the portable communication terminal. In a case where there are a plurality of nearby users, the terminal information acquirer may acquire the terminal identification information from the portable communication terminal carried by each of the multiple nearby users, and the user authenticator may display, on the user authentication screen, in an arrangement in accordance with the distance and the direction detected by the nearby terminal determiner, the user selection item of one of the plurality of nearby users carrying the portable communication terminal having a piece of the terminal identification information, among a plurality of pieces of the acquired terminal identification information, that matches one of a plurality of pieces of the terminal identification information registered by the user registrator.

With this configuration, in a case where the portable communication terminals related to multiple registered users are located near the processing device, display can be performed on the user authentication screen in an arrangement in accordance with the distance and the direction of each of the portable communication terminals. Thus, even in a case where multiple portable communication terminals are located nearby, the number of operational errors where a user accidentally logs in as another user can be reduced.

(v) In a case where the user selection item of the user having a low priority is selected in a state in which display of the user selection item of the nearby user is prioritized, the user authenticator may perform a notification to prompt a confirmation.

It is assumed that the user operating the processing device is the user located at the nearest position. According to the present aspect, by prompting a confirmation in a case where the user selection item having a low priority is possibly selected by mistake, the number of operational errors where a user accidentally logs in as another user can be reduced.

(vi) In a case where the nearby terminal determiner determines that the terminal identification information acquired by the terminal information acquirer does not match any of a plurality of pieces of the terminal identification information registered by the user registrator, the user registrator may provide a selection item related to the start of an operation of updating any of the plurality of pieces of the terminal identification information registered.

With this configuration, in a case where the portable communication terminal of the registered user is changed due to a model change or the like, operation of updating the registered terminal identification information can be easily started.

(vii) An aspect of the disclosure includes a user authentication reception method including, by a processor, receiving registration of a user and terminal identification information of a portable communication terminal as one piece of personal information associated with the user, and storing the user and the terminal identification information in a storage device, displaying a selection item related to a registered user on a user authentication screen, and performing authentication of the registered user in response to a selection operation, performing wireless communication with the portable communication terminal carried by a nearby user to acquire the terminal identification information of the portable communication terminal, determining whether the terminal identification information acquired by the terminal information acquirer matches the terminal identification information included in the personal information of the nearby user, and in a case where the terminal identification information acquired by the terminal information acquirer matches the terminal identification information included in the personal information of the nearby user, displaying a user selection item of the nearby user, in a manner such that the user selection item of the nearby user has a priority higher than the user selection item of another user.

The aspects of the disclosure include a combination of any of the multiple aspects described above.

In addition to the embodiments described above, various modifications may be made regarding the disclosure. It should not be understood that those modifications do not belong to the scope of the disclosure. The disclosure shall include meanings equivalent to the scope of the Claims and all modifications within the scope.

REFERENCE SIGNS LIST

10: Multifunction peripheral
13: Image processing device
15: Document feeding device
17: Document scanning device
19: Printing device
20: Controller
20A: User authenticator
20N: Nearby terminal determiner
20P: Processing executor
20R: User registrator
20T: Terminal information acquirer
30: Operation inputter
30D: Display device
30I: Input detection device
32: Storage device
32U: Personal information
34: Communication circuit
40: Portable terminal
50, 52: User registration dialog
54, 58, 66, 74, 80, 82: User authentication screen
55, 56, 68, 70, 76, 78, 84, 86: User icon
57: Arrow key
60: User list
62, 64, 72, 88: Message dialog

The invention claimed is:

1. A processing device capable of user authentication, the processing device comprising:
a user registrator that receives registration of a user and terminal identification information of a portable communication terminal as one piece of personal information associated with the user;
a storage device that stores the personal information for each user;
a user authenticator that displays a selection item related to a registered user on a user authentication screen and performs authentication of the registered user in response to a selection operation;
a terminal information acquirer that performs wireless communication with the portable communication terminal carried by a nearby user to acquire the terminal identification information of the portable communication terminal; and a nearby terminal determiner that determines whether the terminal identification information acquired by the terminal information acquirer matches the terminal identification information included in the personal information of the nearby user, wherein in a case where the terminal identification information acquired by the terminal information acquirer matches the terminal identification information included in the personal information of the nearby user, the user authenticator displays a user selection item of the nearby user on the user authentication screen, in a manner such that the user selection item of the nearby user has a priority higher than the user selection item of another user.

2. The processing device according to claim 1, wherein the user authenticator presents a difference in the priority, using at least one of an arrangement, a size, an intensity, or a color of the user selection item to be displayed on the user authentication screen, and a change of the arrangement, size, intensity, and color.

3. The processing device according to claim 1, wherein in a case where there are a plurality of the nearby users, the terminal information acquirer acquires the terminal identification information from the portable communication terminal carried by each of the plurality of the nearby users, and the user authenticator displays, on the user authentication screen in a manner such that the user selection item has a higher priority, the user selection item of one of the plurality of the nearby users carrying the portable communication terminal having a piece of the terminal identification information, among a plurality of pieces of the acquired terminal identification information, that matches one of a plurality of pieces of the terminal identification information registered by the user registrator.

4. The processing device according to claim 1, wherein the nearby terminal determiner performs wireless communication with the portable communication terminal carried by the nearby user to detect a distance and a direction to the portable communication terminal, and in a case where there are a plurality of the nearby users, the terminal information acquirer acquires the terminal identification information from the portable communication terminal carried by each of the multiple nearby users, and the user authenticator displays, on the user authentication screen, in an arrangement in accordance with the distance and the direction detected by the nearby terminal determiner, the user selection item of one of the plurality of the nearby users carrying the portable communication terminal having a piece of the terminal identification information, among a plurality of pieces of the acquired terminal identification information, that matches one of a plurality of pieces of the terminal identification information registered by the user registrator.

5. The processing device according to claim 1, wherein in a case where the user selection item of the user having a low priority is selected in a state in which display of the user selection item of the nearby user is prioritized, the user authenticator performs a notification to prompt a confirmation.

6. The processing device according to claim 1, wherein in a case where the nearby terminal determiner determines that the terminal identification information acquired by the terminal information acquirer does not match any of a plurality of pieces of the terminal identification information registered by the user registrator, the user registrator provides a selection item related to a start of an operation of updating any of the plurality of pieces of the terminal identification information registered.

7. A user authentication reception method comprising:

receiving registration of a user and terminal identification information of a portable communication terminal as one piece of personal information associated with the user, and storing the user and the terminal identification information in a storage device;

displaying a selection item related to a registered user on a user authentication screen and performing authentication of the registered user in response to a selection operation;

performing wireless communication with the portable communication terminal carried by a nearby user to acquire the terminal identification information of the portable communication terminal;

determining whether the terminal identification information acquired by the terminal information acquirer matches the terminal identification information included in the personal information of the nearby user; and in a case where the terminal identification information acquired by the terminal information acquirer matches the terminal identification information included in the personal information of the nearby user, displaying a user selection item of the nearby user, in a manner such that the user selection item of the nearby user has a priority higher than the user selection item of another user.

\* \* \* \* \*